United States Patent [19]

Ogawa

[11] Patent Number: 4,945,966
[45] Date of Patent: Aug. 7, 1990

[54] RADIAL TIRE TREAD FOR HEAVY-DUTY ROAD VEHICLES HAVING PLATFORM DEPTH MAINTAINED WITH WEAR

[75] Inventor: Hiroshi Ogawa, Higashiyamato, Japan

[73] Assignee: Bridgestone Corporation, Kyo, Japan

[21] Appl. No.: 111,332

[22] Filed: Oct. 22, 1987

[30] Foreign Application Priority Data

Oct. 23, 1986 [JP] Japan .................. 61-250862

[51] Int. Cl.$^5$ .................................................. B60C 11/06
[52] U.S. Cl. ................................................. 152/209 R
[58] Field of Search .......... 152/209 R, 209 D, 209 A, 152/DIG. 3

[56] References Cited

U.S. PATENT DOCUMENTS

| 2,197,662 | 4/1940 | Hughes | 152/209 R |
| 2,240,542 | 5/1941 | Bourdon | 152/209 R |
| 2,260,193 | 10/1941 | Overman | 152/209 R |
| 2,265,543 | 12/1941 | Overman | 152/209 R |
| 4,217,942 | 8/1980 | Takigawa et al. | 152/209 R |
| 4,345,632 | 8/1982 | Takigawa et al. | 152/209 R |

FOREIGN PATENT DOCUMENTS

| 94802 | 7/1980 | Japan . |
| 54-153646 | 6/1981 | Japan . |

Primary Examiner—Michael W. Ball
Assistant Examiner—Geoffrey L. Knable

[57] ABSTRACT

To maintain excellent antiwet skidding performance and good tire external appearance until a radial tire for heavy-duty road vehicles serves its time, a plurality of narrow grooves (40) are formed along at least longitudinal direction of each of plural platforms arranged at intervals in circumferential direction of each of land portions formed between two main circumferential grooves, in order to separate the platform from the tire land portion. This is because the narrow grooves serve to decrease the rigidity of the platforms and therfore to allow the platforms to be more slidably movable relative to the ground to increase abrasion rate on the platform surface, thus maintaining a height difference between the tire land portions and the platforms.

12 Claims, 10 Drawing Sheets

RADIAL TIRE TREAD FOR HEAVY-DUTY ROAD VEHICLES HAVING PLATFORM DEPTH MAINTAINED WITH WEAR

BACKGROUND OF THE INVENTION

1. Field of the Invention

The present invention relates to a radial tire for heavy-duty road vehicles, and more specifically to an improvement in tread pattern formed on a tire tread, which can maintain excellent antiwet skidding performance while keeping a good tire external appearance until the tire is worn out.

2. Description of the Prior Art

Figure 1A:
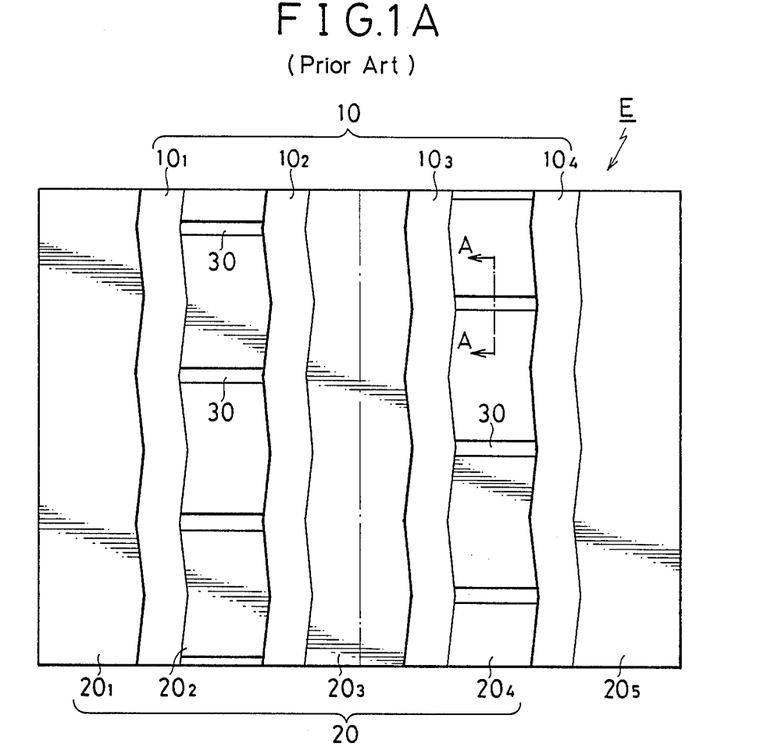
FIG. 1A is a partial plan view showing only an essential portion of a prior-art tread pattern of a radial tire for heavy-duty road vehicle.
Figure 1B:
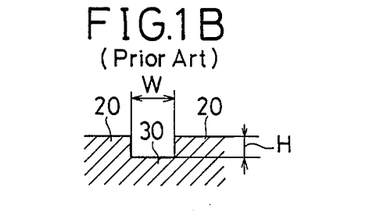
FIG. 1B is a cross-sectional view taken along the line A—A shown in FIG. 1A.

In radial tires for heavy-duty road vehicles such as trucks or buses, special tread patterns are formed in order to provide good antiwet skidding performance and good tire external appearance. FIGS. 1A and 1B show an example of these prior-art tread patterns, in which a plurality of main circumferential grooves 10 are arranged at regular intervals in the tire transverse direction on the tire tread surface and further a plurality of platforms 30 are formed also at regular intervals in the tire circumferential direction on tire land portion 20 formed between two main circumferential grooves 101 and 102 in such a way to provide a height difference H down from the land portion 20.

In the above-mentioned prior-art tread pattern, since the surface of the land portion 20 wears away more when compared with that of the platform 30, the height difference H between the two decreases with increasing tire travel distance, thus resulting in a problem in that as the tire travel distance increases, not only the good tire external appearance cannot be kept, but also the good antiwet skidding performance is not maintained.

SUMMARY OF THE INVENTION

With these problems in mind, therefore, it is the primary object of the present invention to provide a radial tire for heavy-duty road vehicles which can maintain good antiwet skidding performance without damaging tire external appearance throughout the tire life time.

To achieve the above-mentioned object, a radial tire for heavy-duty road vehicles according to the present invention comprises: (a) a plurality of main circumferential grooves arranged at intervals in transverse direction of a tire tread; (b) a plurality of platforms arranged at intervals in circumferential direction of each of land portions formed between the two main circumferential grooves, the platform having a depth shallower than that of the main circumferential grooves so as to provide a height difference down from the tire land portion; and (c) a plurality of narrow grooves formed along at least longitudinal direction of each of the platforms to separate the platform from the tire land portion.

The platforms are formed on two land portions adjacent to a central land portion, on two land portions near the tire tread ends, or on a central land portion. Once or both lateral ends of each of the platforms extend open to the main circumferential grooves or are closed in the land portion. The platforms extend in the transverse direction of the tire tread or at an inclination angle with respect to the transverse direction of the tire tread. The platform can be formed circular in shape.

The present invention is based upon an improvement in tread pattern formed in tire tread. In more detail, in order to solve the problems involved in the prior-art tires, the inventors have found that it is necessary to coincide the wear rate on the surface of the platform 30 with that of the land portion 20. The wear on the tire tread is proportional to wear causing work, and this wear causing work is proportional to a product of the degree of tire slip motion relative to the ground and a force applied to the tire. Therefore, when the degree of tire slip motion is increased on the surface of the platform 30 relative to the ground, it is possible to increase the wear rate on the surface of the platform 30. Therefore, when a load is applied to the tire in use and therefore the tire tread is in contact with the ground, it is preferable that the surface of the platform 30 is also in contact with the ground.

In the tread pattern of the present invention, since a pair of narrow grooves are formed on both the sides of each platform so as to extend at least along the longitudinal direction of the platform, the platform is separated from the land portion by these narrow grooves and therefore the rigidity of the platform can be decreased, so that the wear rate on the surface of the land portion is matched with that of the platform. As a result, the height difference between the surfaces of the land portion and the platform can be maintained until the tire is worn away.

BRIEF DESCRIPTION OF THE DRAWINGS

The features and advantages of the radial tire for heavy-duty road vehicles according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

FIGS. 2 to 9 show various embodiments of the radial tires E according to the present invention. In these drawings, a plurality of main circumferential grooves 10 are arranged at regular intervals in the transverse direction of the tire tread T (in the axial direction of the tire). Therefore, a plurality of land portions 20 are formed between two of these main circumferential grooves 10. Further, a plurality of shallow platforms 30 having a radial height distance H (difference in level down from the tire tread T) are formed on some land portions at regular intervals in the circumferential direction of the tire tread. The depth H of the platform 30 is shallower than that of depth D of the main groove 10.

The gist of this invention is to provide narrow grooves 40 on both the sides of the platform 30 so as to extend at least in the longitudinal direction of the platform 30, in order that the platform 30 is clearly separated from the land portion 20 by the narrow grooves 40 or that the rigidity of the platform 30 can be decreased.

Figure 2A:
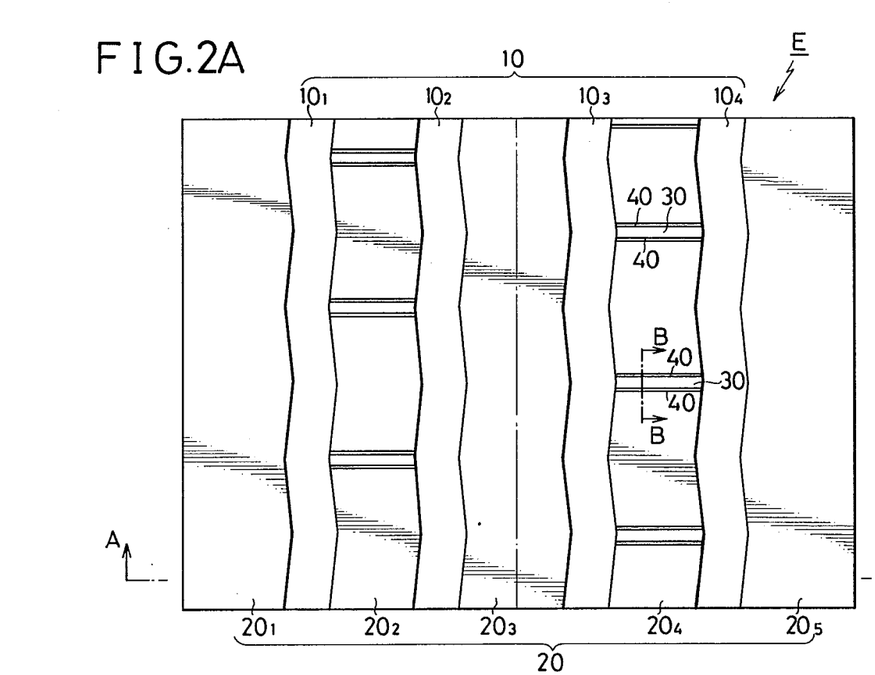
FIG. 2A is a partial plan view showing an essential portion of a first embodiment of the tread pattern of a radial tire for heavy-duty road vehicle according to the present invention.
Figure 2B:
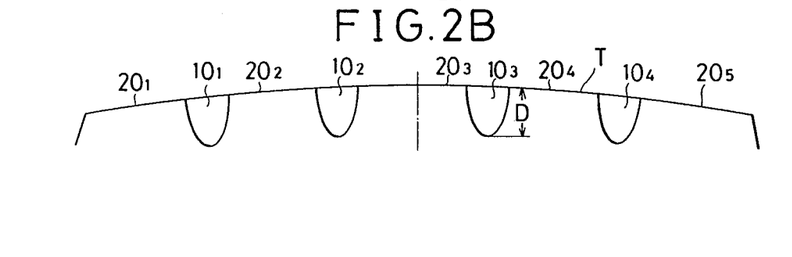
FIG. 2B is a cross-sectional view taken along the line A—A shown in FIG. 2A.
Figure 2C:
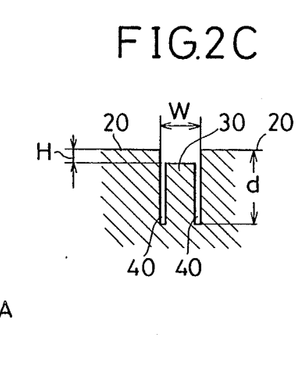
FIG. 2C is a cross-sectional view taken along the line B—B shown in FIG. 2A.

FIG. 2A to 2C show a first embodiment of the radial tire according to the present invention. In this embodiment, the platforms 30 are formed at regular intervals in the tire circumferential direction on the land portion $20_2$ formed between the main groove $10_1$ on the leftward shoulder side (in the drawing) and the main groove $10_2$ on the central side and on the land portion $20_4$ formed between the main groove $10_4$ on the rightward shoulder side and the main groove $10_3$ on the central side in such a way that both side ends of the platform 30 are open to the shoulder-side main grooves $10_1$ and $10_4$ and the central-side main grooves $10_2$ and $10_3$.

In this embodiment, the platform 30 is formed in a straight transverse line, and is partitioned from the land portion 20 by the narrow grooves 40 formed on both the sides of the platform 30 so as to extend along the longitudinal direction of the platform 30.

Figure 3A:
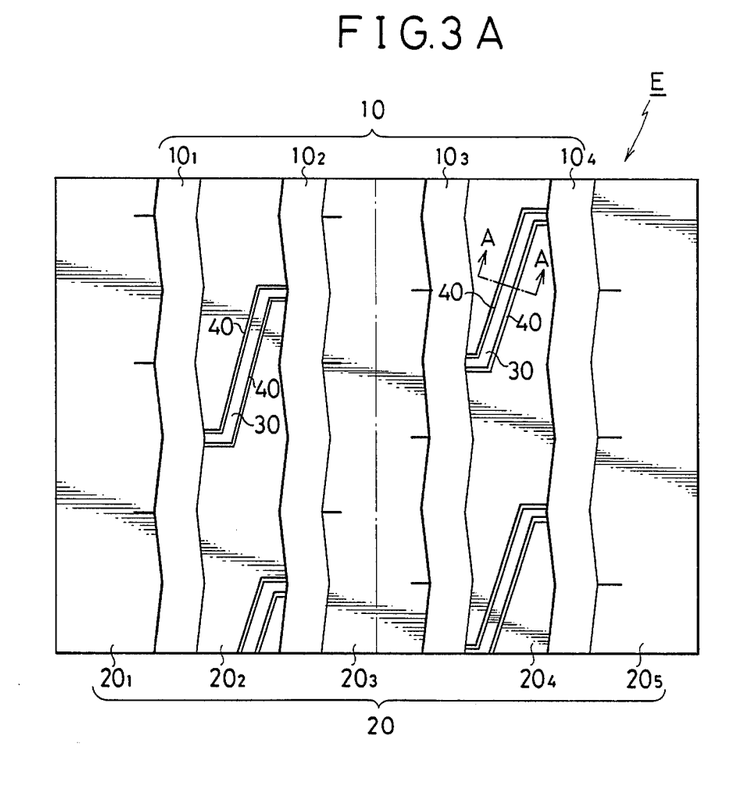
FIG. 3A is a partial plan view showing an essential portion of a second embodiment of the tread pattern of a radial tire for heavy-duty road vehicle according to the present invention.
Figure 3B:
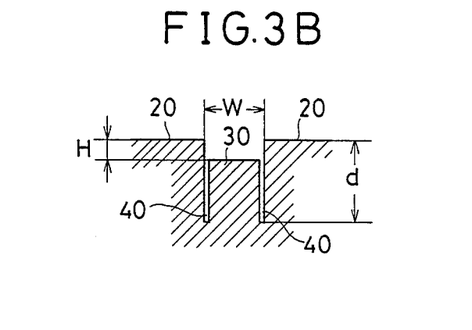
FIG. 3B is a cross-sectional view taken along the line A—A shown in FIG. 3A.

FIGS. 3A and 3B show a second embodiment thereof. In the same way as in the first embodiment, the platforms 30 are formed at regular intervals in the tire circumferential direction on the land portions $20_2$ and $20_4$ and also both the side ends of the platforms 30 are open to the shoulder side main grooves $10_1$ and $10_4$ and the center-side main grooves $10_2$ and $10_3$.

However, being different from the first embodiment, the two transverse open ends of the platform 30 are offset or dislocated along the tire circumferential direction and further, these two transverse open ends of the platform 30 are connected by an oblique straight portion inclined with respect to the tire tread transverse direction toward the tire circumferential direction. In the same way, the reverse Z-shaped platform 30 is separated from the land portion 20 by the two narrow grooves 40 formed along both the sides of the platform 30 so as to extend in the longitudinal direction of the platform 30.

Figure 4A:
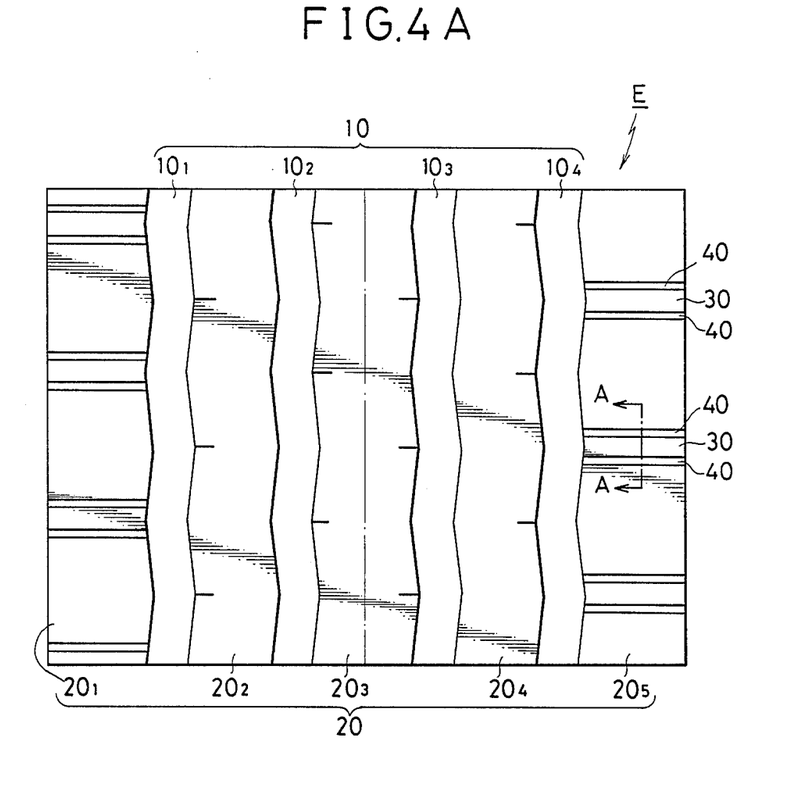
FIG. 4A is a partial plan view showing an essential portion of a third embodiment of the tread pattern of a radial tire for heavy-duty road vehicle according to the present invention.
Figure 4B:
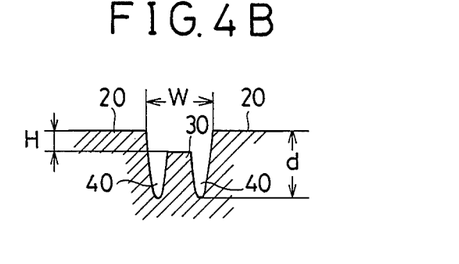
FIG. 4B is a cross-sectional view taken along the line A—A shown in FIG. 4A.

FIGS. 4A and 4B show a third embodiment thereof. In this embodiment, the platforms 30 are formed at regular intervals in the tire circumferential direction, on the leftward shoulder $20_1$ and the rightward shoulder $20_5$ in such a way that one end of the platform 30 is open to the main groove $10_1$ or $10_4$ on the leftward or rightward shoulder side. In the same way as in the first embodiment, the platform 30 is formed straight, and is partitioned from the land portion 20 by the narrow grooves 40 (a little wider than those in the first and second embodiment because of the presence on the shoulder portions $20_1$ or $20_5$) provided on both the sides of the platform 30 so as to extend along the longitudinal direction of the platform 30.

Figure 5A:
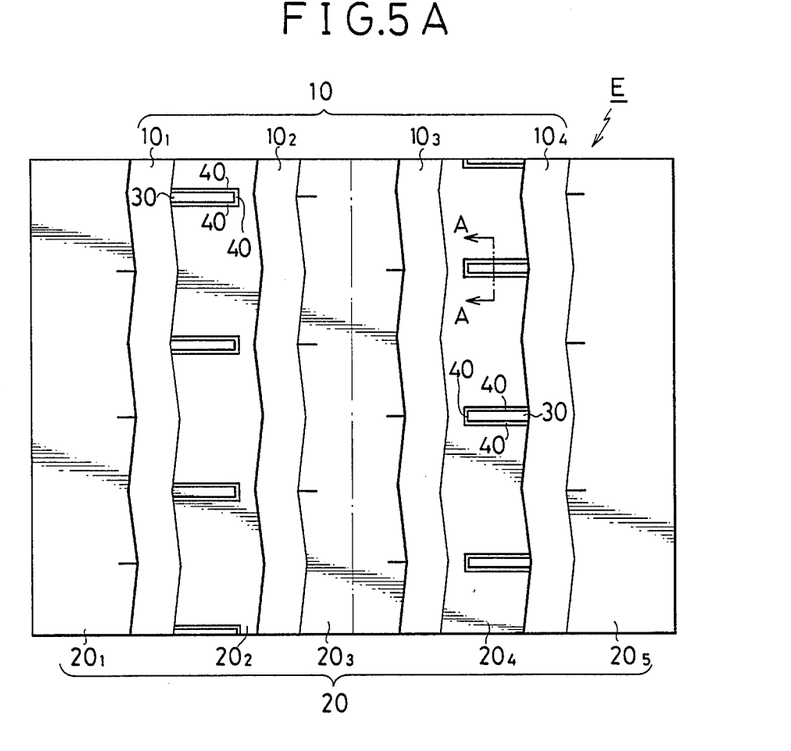
FIG. 5A is a partial plan view showing an essential portion of a fourth embodiment of the tread pattern of a radial tire for heavy-duty road vehicle according to the present invention.
Figure 5B:
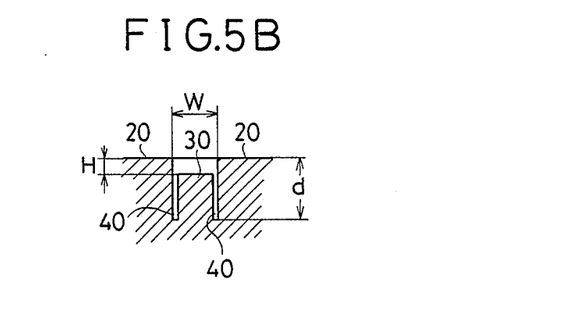
FIG. 5B is a cross-sectional view taken along the line A—A shown in FIG. 5A.

FIGS. 5A and 5B show a fourth embodiment thereof. In this embodiment, the platforms 30 are formed at regular intervals in the tire circumferential direction, on the land portion $20_2$ formed between the main groove $10_1$ on the leftward shoulder side and the main groove $10_2$ on the central side and the land portion $20_4$ formed between the main groove $10_4$ on the rightward shoulder side and the main groove $10_3$ on the central side in such a way that only the outer side end of the platform 30 is open to the main groove $10_1$ or $10_4$ on the leftward or rightward shoulder side. In the same way as in the first embodiment, the platform 30 is formed straight, and is partitioned from the land portion 20 by the narrow grooves 40 provided along the platform 30 so as to extend substantially along the longitudinal direction of the platform 30 and a little along the lateral direction of the platform 30.

Figure 6A:
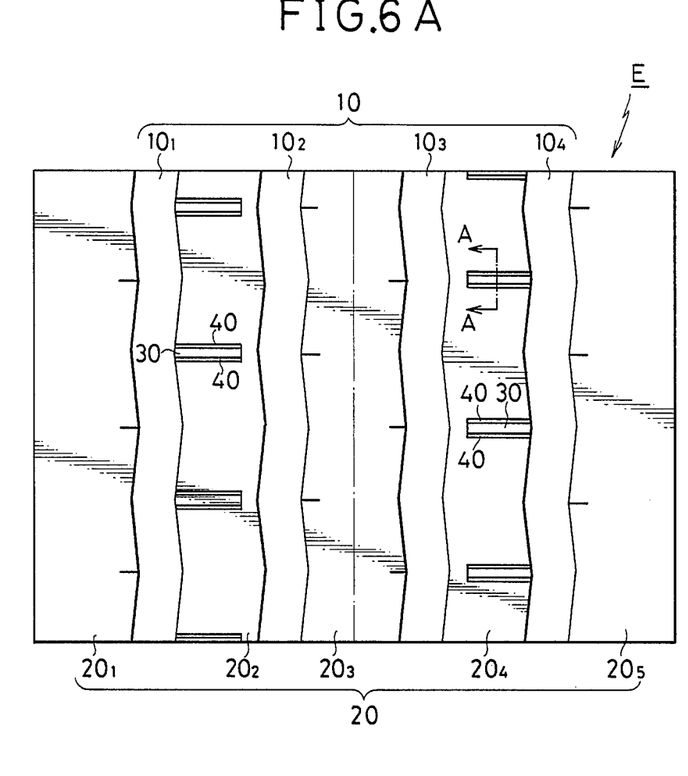
FIG. 6A is a partial plan view showing an essential portion of a fifth embodiment of the tread pattern of a radial tire for heavy-duty road vehicle according to the present invention.
Figure 6B:
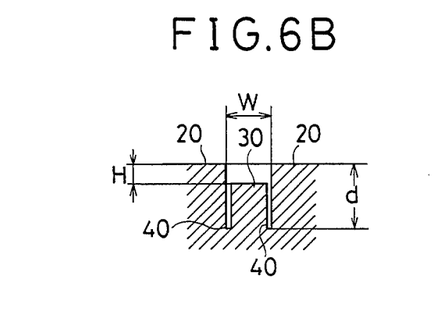
FIG. 6B is a cross-sectional view taken along the line A—A shown in FIG. 6A.

FIGS. 6A and 6B show a fifth embodiment thereof. This embodiment is essentially the same as the fourth embodiment shown in FIGS. 5A and 6B, except there exists no narrow groove extending along the lateral direction of the platform 30 on the center side thereof. Therefore, the one center side of the platform 30 is separated from the land portion only by a height difference.

Figure 7A:
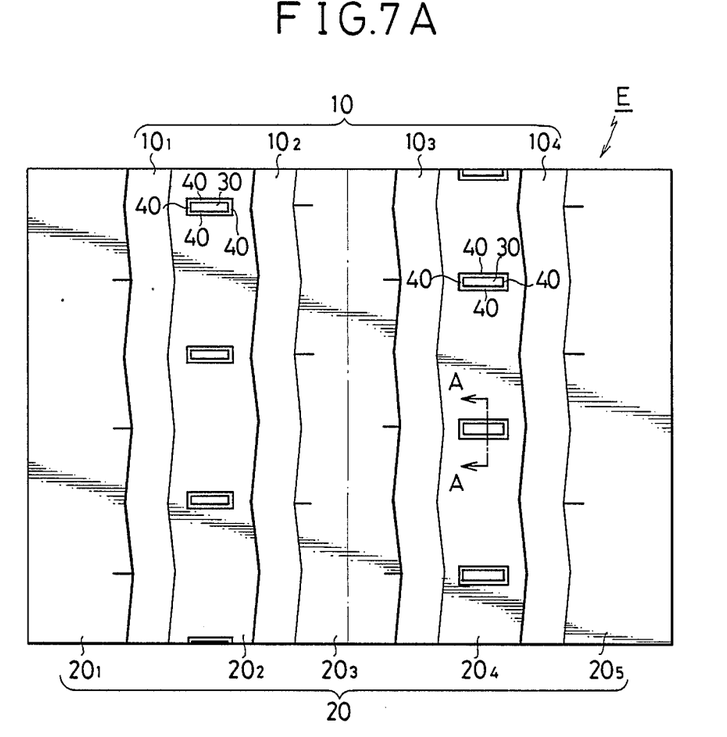
FIG. 7A is a partial plan view showing an essential portion of a sixth embodiment of the tread pattern of a radial tire for heavy-duty road vehicle according to the present invention.
Figure 7B:
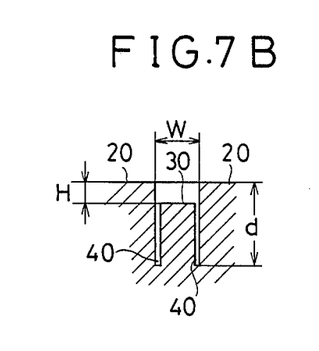
FIG. 7B is a cross-sectional view taken along the line A—A shown in FIG. 7A.

FIGS. 7A and 7B show a sixth embodiment thereof. In the same way as in the fifth embodiment shown in FIGS. 6A and 6B, the platforms 30 are formed at regular intervals in the tire circumferential direction, on the land portions $20_2$ and $20_4$. However, both side ends of the platform 30 are closed without being open to the adjacent main grooves.

The platform 30 is formed straight, and is partitioned from the land portion 20 by the narrow grooves 40 provided along the platform 30 so as to extend substantially along the longitudinal direction of the platform 30 and along the lateral direction of the platform 30 to surround the platform 30.

Figure 8A:
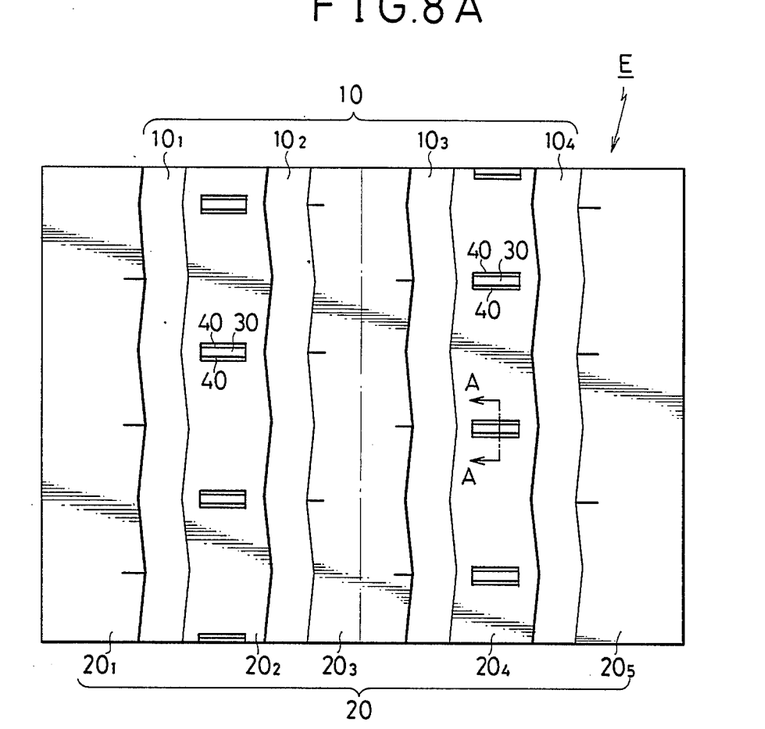
FIG. 8A is a partial plan views showing an essential portion of a seventh embodiment of the tread pattern of a radial tire for heavy-duty road vehicle according to the present invention.
Figure 8B:
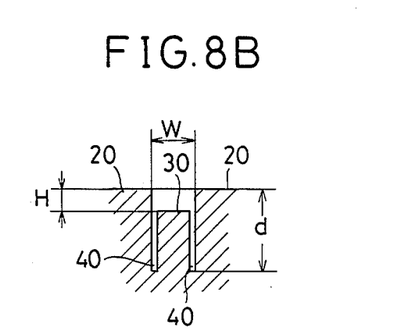
FIG. 8B is a cross-sectional view taken along the line A—A shown in FIG. 8A.

FIGS. 8A and 8B show a seventh embodiment thereof. This embodiment is essentially the same as the sixth embodiment shown in FIGS. 7A and 7B, except there exists no narrow groove extending along the lateral direction of the platform 30 on both the sides of the platform 30. Therefore, the both transverse sides of the platform 30 are separated from the land portion only by a height difference.

Figure 9A:
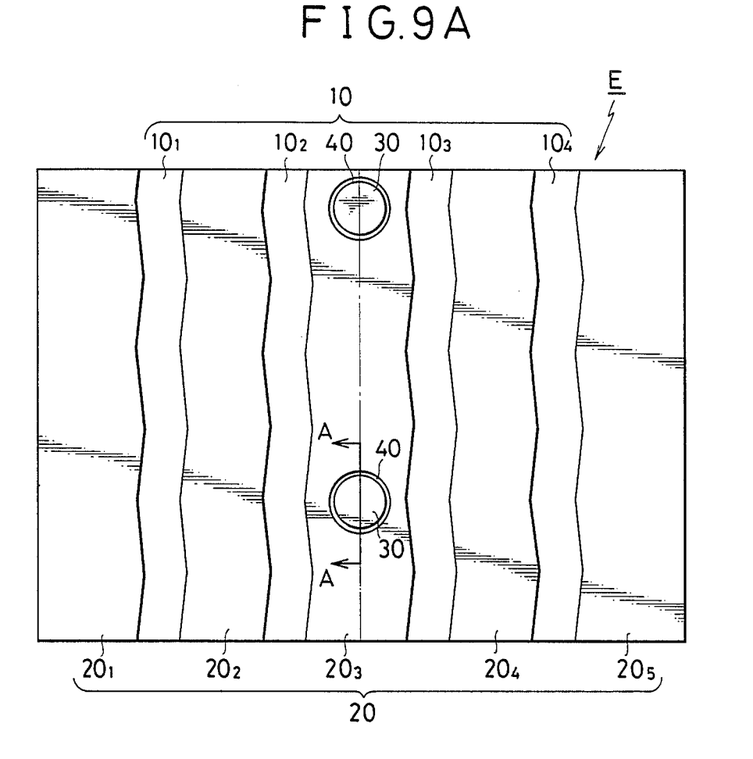
FIG. 9A is a partial plan view showing an essential portion of an eighth embodiment of the tread pattern of a radial tire for heavy-duty road vehicle according to the present invention.
Figure 9B:
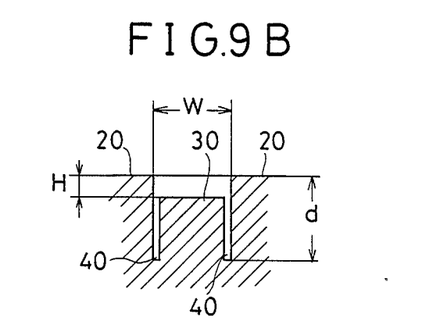
FIG. 9B is a cross-sectional view taken along the line A—A shown in FIG. 9A.

FIGS. 9A and 9B show an eighth embodiment thereof. In this embodiment, the platforms 30 are formed at regular intervals in the tire circumferential direction, on the land portion 20 formed between the main groove $10_2$ on the leftward center side and the main groove $10_3$ on the rightward center side. Being different from the other embodiments, the platform 30 is formed into a circular shape, and is separated from the land portion $20_3$ by a narrow circular groove 40.

In the various embodiments, it is preferable to determine the height difference H between the surface of the platform 30 and the land portion within a range between 0.5 and 3 mm.

As described above, in the radial tire according to the present invention, since the narrow grooves 40 are formed on both the sides of the platform 30 at least along the longitudinal direction of the platform 30 so as to partition the platform 30 from the land portion 20 by these narrow grooves 40, the platforms 30 are so formed as to be readily movable relative to the ground road as compared when no narrow grooves are formed substantially along the longitudinal direction of the platforms. Therefore, the abrasion on the surface of the platform 30 is increased to such an extent that the wear rate on the surface of the land portion 20 is substantially equal to that on the surface of the platform 30, thus maintaining a height different H between the surface of the land portion 20 and the surface of the platform 30. The presence of the above-mentioned height difference on the tire tread serves to maintain the good antiwet skidding performance and simultaneously good tire external appearance over the life of tire.

Test Results

To verify the effect of the radial tire according to the present invention, the following tests were made.

(Test 1)

In this test, tire travel distances over which the height difference between the land and the platform can be maintained were actually measured.

TABLE 1

Specifications of Test Tires
*Tire size: TBR 1000R 20
*Tire rim: 750 V20
*Tire patterns: Dimensions of platform were as shown in Table 1 below

|  | H (mm) | W (mm) | d (mm) |
| --- | --- | --- | --- |
| Prior-art Tire 1 (FIGS. 1A and 1B) | 2.0 | 4.0 | No groove |
| Invention Tire 0 (FIGS. 2A and 2C) | 1.0 | 5.0 | 8.0 |

TABLE 1-continued

Specifications of Test Tires
*Tire size: TBR 1000R 20
*Tire rim: 750 V20
*Tire patterns: Dimensions of platform were as shown in Table 1 below

|  | H (mm) | W (mm) | d (mm) |
| --- | --- | --- | --- |
| Invention Tire 1 (FIGS. 2A and 2C) | 3.5 | 4.0 | 11.0 |
| Invention Tire 2 (FIGS. 2A and 2C) | 3.5 | 4.0 | 6.0 |
| Invention Tire 3 (FIGS. 2A and 2C) | 3.0 | 5.0 | 8.0 |
| Invention Tire 4 (FIGS. 2A and 2C) | 2.0 | 4.0 | 11.0 |

H: Height difference between land and platform
W: Platform width
d: Depth of narrow groove 40 from land
Test Conditions
*Tire inner pressure:  Regular pressure (JIS)
*Tire Load:  Regular load (JIS)
*Travel distance and speed:  Ordinary road: 40% of total distance at 40 km/hr
 Speedway road: 60% of total distance at 90 km/hr Test Results Travel distances over which a height difference can be maintained between land and platform are listed below.

TABLE 2

|  | Travel Distance (km) |
| --- | --- |
| Prior-art Tire 1 | 16,000 |
| Invention Tire 0 | 70,000 |
| Invention Tire 1 | 98,000 |
| Invention Tire 2 | 52,000 |
| Invention Tire 3 | 70,000 |
| Invention Tire 4 | 97,000 |

Table 2 indicates (1) In the prior-art tire 1 in which only a height difference is provided between the land portion 20 and the platform 30, the height difference H decreases with increasing travel distance, and therefore it is impossible to maintain both stable antiwet skidding performance and good external tire appearance after travel distance of 16,000 km.

(2) In contrast, in the invention tires 0 to 4, the travel distance over which the above height difference can be maintained has been increased markedly. Therefore, an excellent antiwet skidding performance and a good tire external appearance can be maintained until the tire serves its life time.

(3) In the Invention tire 1 in which the depth d of the narrow groove 40 from the land portion is the deepest (11 mm), the travel distance is the longest. That is, the deeper the narrow groove depth is, the longer will be the travel distance. Further, it is preferable to determine the depth d of the narrow groove 40 to be equal to or deeper than that D of the main groove 10.

(Test 2)

Various tests were made to examine wear states of the platforms 30 of various embodiments. Some test results are described below.

Figure 10A:
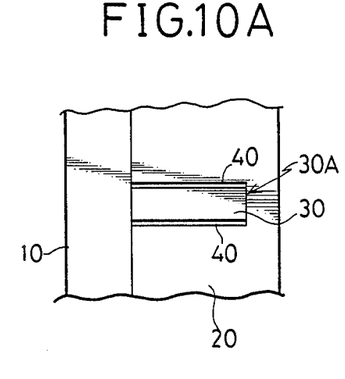
FIG. 10A is an enlarged platform plan view for assistance in explaining the effect of the narrow groove formed along the lateral end of the platform.

(1) In the first embodiment shown in FIGS. 6A and 6B and the seventh embodiment shown in FIGS. 8A and 8B, one or both of the lateral ends of the platform 30 are not formed with the narrow grooves 40 as shown in FIG. 10A (in which no narrow groove 40 is formed along one 30A of the lateral end of the platform 30). In this embodiment, the height difference H is apt to be easily decreased on the lateral side 30A at which no narrow groove 40 is formed.

Figure 10B:
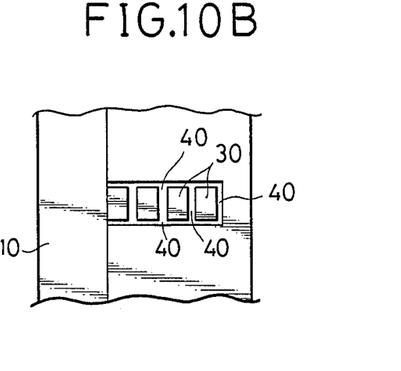
FIG. 10B is an enlarged platform plan view for assistance in explaining the disadvantage of the platform formed intermittently.

(2) When the platform 30 is not formed continuous but formed intermittent as shown in FIG. 10B, although there exists an effect of maintaining the height difference H, since the rigidity of the platform 30 decreases excessively, the divided sections of the platform 30 are readily broken off, thus there exists a problem in that the tire external appearance is degraded.

Figure 10C:
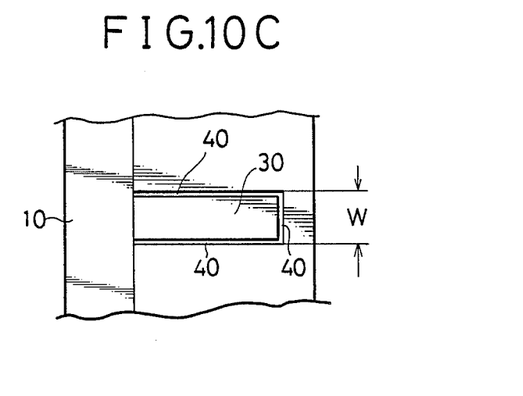
FIG. 10C is an enlarged platform plan view for assistance in explaining the effect of the width W of the platform.

(3) Where the width W of the platform 30 (shown in FIG. 10C) exceeds 15 mm, since the rigidity of the platform 30 increases excessively, there exists a tendency that the height difference H between the platform 30 and the land portion 20 decreases.

As described above, in the radial tire for heavy-duty road vehicles according to the present invention, since narrow grooves are formed at least along the longitudinal direction of the platform to separate the platform from the tire land portion, the platforms are easy to slidably move relative to the ground and therefore the platforms are easily worn away as in the land portion of the tire tread. Since the abrasion rate is roughly the same in both the surfaces of the tire land portion and the platform, it is possible to maintain the height difference between the land portion and the platform until the tire serves its time, thus ensuring reliable antiwet skidding performance and good tire external appearance.

What is claimed is:

1. A radial tire for heavy-duty road vehicles, comprising:
   (a) at least two main circumferential grooves (10) arranged at intervals in the transverse direction of a tire tread (T);
   (b) a plurality of platforms (30) arranged at intervals in the circumferential direction on land portions (20) formed between said two main circumferential grooves (10), said platforms having a height difference (H) smaller than a depth of said main circumferential grooves so as to provide a height difference down from the surface of the tire land portion; and
   (c) a plurality of narrow grooves (40) formed in a land portion along each of said platforms to separate said platform from the tire land portion, wherein when a regular load is applied to said tire in use, surfaces of said platforms are in contact with the ground during tire rotation such that the wear rate on the surface of the land portion is substantially equal to that on the surface of the platform and said height difference is substantially maintained over the life of the tire.

2. The radial tire as set forth in claim 1, wherein said platforms (30) are formed on two land portions ($20_2$, $20_4$) formed adjacent to a central land portion ($20_3$).

3. The radial tire as set forth in claim 1, wherein said platforms (30) are formed on land portions ($20_1$, $20_5$) formed near ends of the tire tread.

4. The radial tire as set forth in claim 1, wherein said platforms (30) are formed on a central land portion ($20_3$).

5. The radial tire as set forth in claim 1, wherein both lateral ends of each of said platforms (30) extend open to two of said main circumferential grooves (10).

6. The radial tire as set forth in claim 1, wherein one lateral end of each of said platforms (30) extends open to said main circumferential groove and the other lateral end of each of said platforms is closed.

7. The radial tire as set forth in claim 1, wherein both lateral ends of each of said platforms (30) are closed.

8. The radial tire as set forth in claim 1, wherein each of said platforms extends in a transverse direction of the tire tread.

9. The radial tire as set forth in claim 1, wherein each of said platforms extends at an inclination angle with respect to a transverse direction of the tire tread.

10. The radial tire as set forth in claim 1, wherein each of said platforms is circular in shape.

11. The radial tire as set forth in claim 1, wherein a width w of said platform (30) is 15 mm or less.

12. The radial tire as set forth in claim 1, wherein a depth d of said narrow grooves (40) is more than 6.0 mm but less than 11.0 mm.

* * * * *